Nov. 29, 1966   L. K. PATNODE   3,288,521
FOLDABLE A-FRAME TRAILER BODY
Filed May 27, 1964   2 Sheets-Sheet 1

INVENTOR.
LEROY K. PATNODE
BY Naylor + Neal
ATTORNEYS

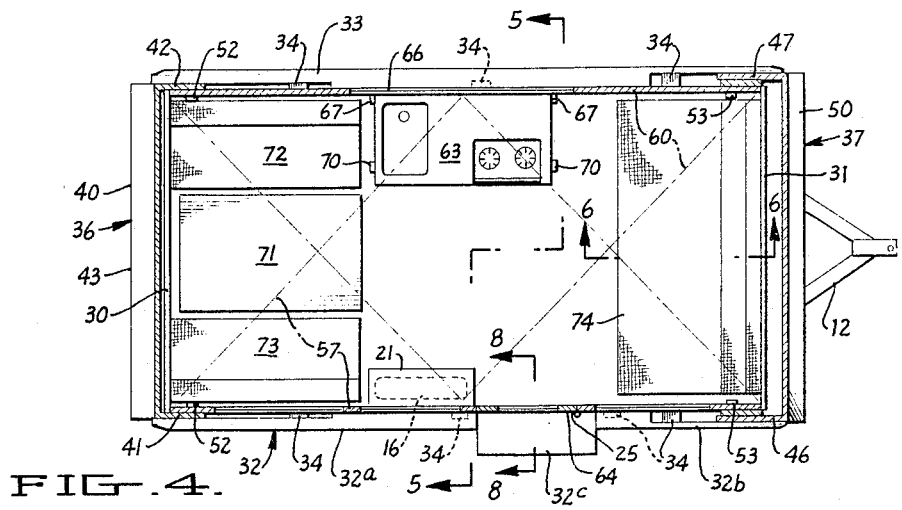

United States Patent Office 3,288,521
Patented Nov. 29, 1966

3,288,521
FOLDABLE A-FRAME TRAILER BODY
Leroy K. Patnode, 2011 Alba Road, Ben Lomond, Calif.
Filed May 27, 1964, Ser. No. 370,458
12 Claims. (Cl. 296—23)

This invention relates to a foldable trailer, and more particularly to such a trailer having an A-frame type roof structure which is adapted to be folded into a collapsed position for transportation and storage.

In the past foldable trailers of various constructions have been available and have met with varying degrees of success. These trailers have taken many forms ranging from simple foldable frameworks over which canvas was stretched to elaborate bodies which were laterally expansible to provide for increased interior area. Between these extremities a presently popular type of foldable trailer is that provided with a fixed bed portion capped by an extensible roof section. The roof sections in this type of trailer typically take either the form of a clam shell type structure hinged at one end to the bed, or a gabled structure having the ridge or peak thereof extending longitudinally of the bed.

Clam shell type roof structures have the disadvantage that they are only effective in increasing trailer headroom at the end of the roof opposed from the hinge thereof, unless, of course, some type of mechanism is provided to elevate said hinge. The latter type of mechanism is disadvantageous from an economical standpoint both with respect to its installation and the installation of the trailer body components necessary for cooperation therewith. Furthermore, elevation mechanisms of this type and the body components necessary for use therewith adversely affect the foldable trailer from a bulk standpoint.

Gabled type roof structures having the ridge or peak thereof running longitudinally of the trailer bed have the disadvantage that the headroom provided by the roof is, of necessity, very limited. This limitation results from the fact that when used with a low trailer bed, such a roof structure must have very steep surfaces, since the width of the trailer bed is very limited. The latter limitation is generally imposed by local highway ordinances.

It is, accordingly, a principal object of this invention to provide a trailer structure of the type having a bed with an extensible roof which overcomes the aforementioned shortcomings of prior art structures of this type.

Another and more specific object of the invention is to provide a foldable trailer body having an A-frame type roof structure with the ridge or peak thereof running transversely of the trailer so as to accommodate maximum headroom and side trailer entry.

Yet another object of the invention is to provide a foldable A-frame type roof structure wherein the surfaces of said structure form the forward and rearward ends of the trailer body in both their extended and retracted positions.

Still another object of the invention is to provide a foldable A-frame room structure for trailers wherein the surfaces of said structure are operatively associated so as to be simultaneously movable between extended and retracted positions with a minimum of effort.

A further object of the invention is to provide a foldable trailer body having living facilities on the interior thereof which collapse and extend simultaneously with the folding of the body.

Another object of the invention is to provide a foldable trailer body wherein the movable components thereof serve a utilitarian function both in their extended and retracted positions.

Basically, the foregoing and other objects are accomplished in the environment of a trailer comprising a wheel supported frame having a tongue extending forwardly therefrom. In its broadest aspect, the improved folding trailer body comprises a substantially rectangular floor received on and extending longitudinally of said frame and having a pair of sidewalls extending upwardly from the opposed sides of said floor in fixed relationship with respect thereto. The foldable roof structure is defined by first and second substantially rectangular roof panels hingedly mounted, respectively, at the opposite ends of said floor transversely between said sidewalls for pivotal movement between retracted positions substantially parallel to and overlying said floor and extended positions wherein the free ends thereof engage to form a gabled roof above said floor. The basic body structure is completed by first and second substantially triangular side panels hingedly secured at one edge thereof, respectively, to each of said sidewalls for pivotal movement between a retracted position overlying and substantially parallel to said floor and an extended position wherein the edges thereof opposed to said one edge engage said roof panels when the latter are in extended engagement.

The detailed structure and the foregoing and other objects of the invention will become more apparent when viewed in light of the accompanying drawings, wherein.

Figure 2:
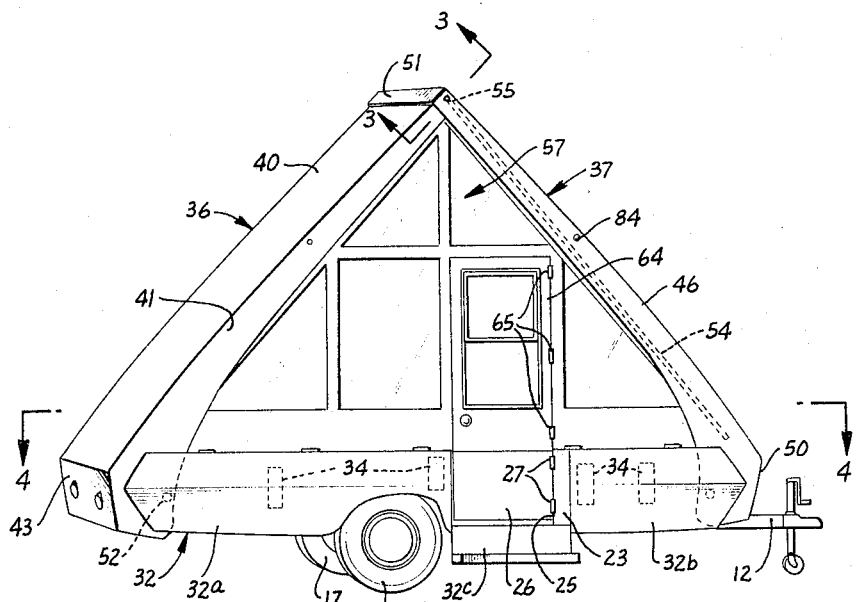
FIG. 2 is a perspective view in side elevation corresponding to FIG. 1 showing the trailer in its extended or open position.
Figure 3:
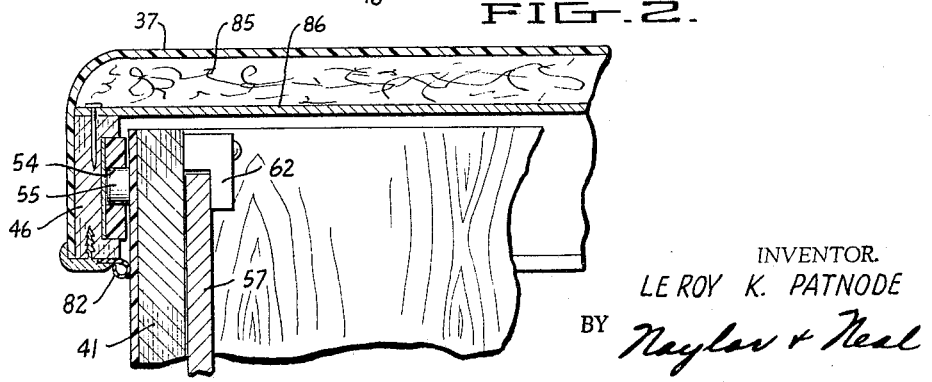

FIGS. 3 and 4 are sectional views taken on lines 3—3 and 4—4, respectively, of FIG. 2;

FIGS. 5 and 6 are sectional views taken on lines 5—5 and 6—6, respectively, of FIG. 4;

FIG. 7 is a sectional view corresponding to FIG. 6, but showing the divan therein in open condition; and, FIG. 8 is a sectional view taken on line 8—8 of FIG. 4 showing a movable side fender section of the foldable trailer body in its extended and retracted positions.

Figure 1:
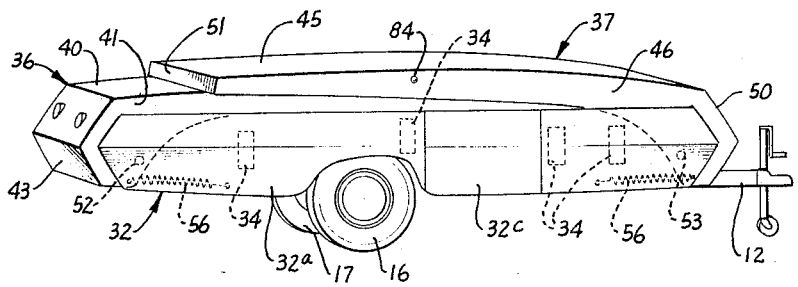
FIG. 1 is a perspective view in side elevation of the inventive trailer in its folded or retracted position.

Referring now to the running and draft structure of the basic trailer illustrated in FIGS. 1, 2, and 5, this includes longitudinally extending frame members 10 and 11 having a draft tongue 12 fixed to and extending forwardly therefrom. The frame members 10 and 11 are supported through helical leaf springs 13 and 14, respectively, by a transversely extending axle 15 carried by wheels 16 and 17. A substantially rectangular floor 20 extends longitudinally over the length of the frame members 10 and 11 and transversely therebetween (see FIG. 5). The floor 20 is provided with cutouts above the wheels 16 and 17, which cutouts are covered by wheel housings 21 and 22, respectively.

The floor 20, together with the wheel housings 21 and 22, forms the base portion of a fixed trailer chassis or bed. This bed includes sidewalls 23 and 24 extending upwardly from opposed longitudinal sides of the floor 20 in fixed relationship with respect thereto. The walls 23 and 24 are secured to the edges of the floor 20 and the wheel housings 21 and 22 adjacent thereto. The wall 23, as is clearly illustrated in FIGS. 2 and 4, is interrupted along the intermediate portion thereof forward of the wheel 16 by a door opening 25. The opening 25 has received therein a door section 26 mounted for outwardly swinging movement about a vertical axis by a pair of hinges 27 secured to the wall 23. The trailer bed is completed by support means for the ends of the sidewalls 23 and 24 taking the form of rearward and forward end walls 30 and 31, respectively.

The sidewalls 23 and 24 have extending over the length thereof and parallel thereto fenders 32 and 33, respectively. The fender 32 comprises a pair of fixed sections 32a and 32b, held to the sidewall 23 by mounting blocks 34, and a movable intermediate section 32c. The section 32c, as illustrated in FIG. 8, is hinged to the floor 20 about an axis extending longitudinally thereof by a hinge bracket 35 for movement between a position coextensive with the sections 32a and 32b and a position extending laterally therefrom and parallel to the floor 20 wherein it forms a step (see the phantom line and solid line representations, respectively, in FIG. 8). It is noted that the movable section 32c is in alignment with the door section 26 and has a width sufficiently greater than the door section to permit the unobstructed outward swinging thereof about the hinges 27. The fender 33 comprises a unitary section fixed to the sidewall 24 by mounting brackets 34.

Referring now to the foldable roof structure, this structure basically comprises substantially rectangular roof panels 36 and 37 hingedly secured, respectively, to the opposite ends of the trailer bed portion for pivotal movement about axes extending transversely thereof. The roof panel 36 comprises a flat surface 40 having longitudinally extending flanges 41 and 42 depending downwardly from the side edges thereof and an end section 43 extending between said flanges and the surface 40 at one end of said panel. The roof panel 37 is similar to the panel 36 in that it comprises a surface 45 having longitudinally extending flanges 46 and 47 depending from the side edges thereof and an end section 50 extending between said flanges and the surface 45 at one end of said panel. An end section 51 extends between the surface 45 and flanges 46 and 47 at the end of the panel 37 opposite the section 50.

The flanges of the roof panels 36 and 37 adjacent the end sections 43 and 50, respectively, extend between the sidewalls 23 and 24 and the fenders adjacent thereto. Through the latter arrangement, the flanges on the respective roof panels facilitate the pivotal mounting of said panels to the end portions of the sidewalls 23 and 24. Specifically, the roof panel 36 is hingedly secured to the sidewalls 23 and 24 by transversely aligned hinge pins 52 extending through said walls and the flanges 41 and 42 adjacent thereto. The panel 37 is similarly hingedly secured to the walls 23 and 24 by transversely extending hinge pins 53 extending therethrough and into engagement with the flanges 46 and 47 adjacent thereto.

From FIGS. 1 and 2, it can be seen that the pivotal mounting of the roof panels 36 and 37 provides for movement thereof between a retracted position substantially parallel to and overlying the floor 20 and an extended position forming an acute angle with respect to said floor. In the retracted position, as illustrated in FIG. 1, the panel 37 overlies the panel 36. Upon being extended, the panels 36 and 37 engage at their free end portions, with the panel 37 overlapping the panel 36 and the end section 51 engaging the surface 40. Simultaneous movement of the roof panels 36 and 37 between their retracted and extended positions is facilitated through means of a track 54 extending longitudinally along the inner surface of the flange 46 and a mating follower 55 mounted on the free end portion of the flange 41 (see FIG. 3). Ideally, the track 54 is formed of a material having a low coefficient of friction, such as nylon. Although only the flanges 46 and 41 are illustrated as being provided with track and follower members, it is to be understood that the flanges 42 and 47 may be similarly provided.

Ease of movement of the roof panels 36 and 37 between their retracted and extended positions is facilitated through counterbalance means provided at the hinged ends thereof. These means take the form of counterbalance coil springs 56 secured at one end to the flanges of the roof panels extending below the hinge pins 52 and 53 and at the other end to the sidewalls 23 and 24 adjacent said pins. From observation of FIGS. 1 and 2, it can be seen that the end sections 43 and 50 of the roof panels and the flanges joined thereto facilitate the mounting and operation of the counterbalance springs 56. The end sections 43 and 50 also provide for the aesthetic and effective closing of the ends of the trailer body in both the retracted and extended positions of the roof panels secured thereto. Specifically, these end sections are formed so as to cover the ends of the bed portion of the trailer in all positions of the roof panels. If desired, sealing means (not illustrated) may be provided between the end sections and the floor 20 to facilitate sealing engagement therebetween when the roof panels 36 and 37 are in the extended position.

At this point it is noted that the fenders 32 and 33 are specifically constructed so as to perform the housing function in combination with the roof panels 36 and 37. FIG. 1 clearly illustrates how the panels function to house the hinged sections of the roof panels and the counterbalance springs cooperating therewith. From FIGS. 4 and 5, it can be seen that the upper edges of the intermediate portions of the fenders 32 and 33 curve inwardly into engagement with the walls 23 and 24 adjacent thereto. This arrangement, i.e., having the fenders curve inwardly only at their intermediate portions, permits the flanges of the roof panels adjacent their hinged ends to pass behind the fenders and at the same time closes the upper portion of the fenders behind which said flanges do not pass. Thus, with the roof panels in the retracted position as illustrated in FIG. 1, there are no gaps between the flanges of the roof sections and the fenders.

Triangular sidewall panels 57 and 60 are hingedly secured at their lower edges to the sidewalls 23 and 24, respectively, by hinges 61 for pivotal movement between a retracted position parallel to and overlying the floor 20 and an extended position engaging the extended roof panels 36 and 37 (see FIG. 5). The panels 57 and 60 are supported in their extended position by latches 62 mounted on the flanges 41 and 42 and may be supported in their retracted position by any suitable means, such as cabinet 63. The detailed interrelationship between the cabinet 63 and the sidewall panels will be developed subsequently.

The sidewall panel 57 is of relatively flat planar form and includes a plurality of windows integral therewith (see FIG. 2) and a door section mounted therein by hinges 65 for pivotal movement about the axis of the hinges 27 when the panel is in the extended position. In the extended position, the door sections 26 and 64 are coextensive and may, if desired, be locked together for unitary pivotal movement between open and closed positions. Naturally, when the door sections are open, the movable fender section 32c is lowered to the position wherein it forms a step.

The sidewall panel 60 corresponds in shape to the panel 57, but differs therefrom in that it is not provided with a door and has formed therein only one window 66. The aforementioned cabinet 63 is secured to the sidewall panel 60 by hinges 67 (see FIGS. 4 and 5) for pivotal movement about an axis parallel to the axis about which said panel pivots with respect to the sidewall 24. The forward end of the cabinet 63 is supported on links 70 secured at the opposite ends thereof, respectively, to said floor and said cabinet for pivotal movement about axes parallel to the axis about which the panel 60 pivots with respect to the sidewall 24. The cabinet 63, links 70, and the proportions and pivotal mountings thereof are so arranged that the links extend parallel to the panel 60 when said panel is in either the extended or retracted position. Thus, as illustrated by the arrow lines in FIG. 5, the links 70 function to move the cabinet 63 between the solid and phantom line positions shown simultaneously with pivotal movement of the sidewall panel 60 about the hinges 61. The cabinet 63 has a height slightly less than the distance that the walls 23 and 24 extend above the floor 30 and, as a result, is confined between said walls when the sidewall panels 57 and 60 are folded to retracted position. Ideally, the cabinet 63 is of a sufficient height to support the panels 57 and 60 substantially parallel to the floor 20 in their retracted position.

The living facilities provided in the trailer body are illustrated in FIG. 1. These facilities include at one end of the body a table 71 having benches 72 and 73 at the sides thereof and at the opposite end of the body a foldable divan 74. The divan, as illustrated in its folded and unfolded conditions in FIG. 6 and 7, respectively, includes a frame 75 fixed to the floor 20 and the endwall 31. The frame 75 has mounted thereon for slidable movement a bottom support 76 having a back 77 hinged thereto. The degree to which the support 76 and back 77 can slide with respect to the frame 75 is limited by a link 80 pivotally secured at the opposite ends thereof, respectively, to said back and the wall 31. The divan is moved between the folded and unfolded conditions illustrated in FIGS. 6 and 7, respectively, simply by sliding the bottom support 76 on the frame 75. A cushion 81 made up in segments is adapted to cover the divan in both its folded and unfolded conditions.

In operation, in order to extend the foldable trailer body from the condition illustrated in FIG. 1 to that illustrated in FIG. 2, it is merely necessary to first raise the roof panels 36 and 37 and subsequently raise the sidewall panels 57 and 60. The movable fender section 32c may be extended into the step position either before or after the roof and sidewall panels are raised. Once the sidewall panels are raised, they may be locked in position by turning the latches 62 into engagement therewith. To facilitate this turning, the latches 62 are mounted so that downwardly extending fingers thereof, as viewed in FIG. 5, may be moved out of engagement with the interior surfaces of the panels 57 and 60. When the side panels are locked in extended engagement with the roof panels, resilient moldings 82 fixed to and extending inwardly from the flanges on the roof panels sealingly engage the edges of the side panels. Since the flanges on the roof panel 37 are spaced outwardly with respect to those on the panel 36, the edges of the side panels adjacent the roof panel 37 have secured thereto spacer strips 83 to assure sealing engagement of the panels 57 and 60 with the flanges on the roof panel 37.

The procedure for retracting the trailer body from the condition illustrated in FIG. 2 to that illustrated in FIG. 1 is simply the reverse of that used to extend the body. Specifically, the panels 60 and 57 are first folded down and then the roof panels 36 and 37 are retracted. It is noted that the counterbalance springs, together with the side panels, function to assure that the roof panels will remain extended once so positioned. The panels are locked in the retracted position by a detent pin 84 adapted to pass through aligned openings in the overlapping flanges of said roof panels when they are in the retracted position. Naturally, other means may be used to lock the panels in retracted position without departing from the invention.

The roof panels 36 and 37 are of a formation ideally suited for fabrication of molded fiber glass. In FIG. 3, the outer shell of the panel 37 is shown as being molded of fiber glass and lined with a fiber glass insulating material 85 capped by a decorative facing 86, of wood or the like. This construction is particularly desirable because it is light in weight while being very strong and relatively inexpensive to fabricate. In actual application, it has been found desirable to apply the fiber glass insulation directly to the fiber glass shell with a bonding agent.

To conclude, from the foregoing detailed description it is believed apparent that the present invention enables the accomplishment of the objects initially set forth herein. In particular, an improved foldable trailer body is provided having an A-frame type foldable roof wherein both head room and entrance area are maximized. It is to be understood, however, that the invention is not intended to be limited to the specific embodiment illustrated and described, but rather is defined by the following claims.

What is claimed is:
1. In a trailer comprising a frame having a draft tongue extending forwardly therefrom and at least one support wheel disposed on either side thereof, an improved folding body comprising:
  (a) a substantially rectangular floor received on and extending longitudinally of said frame;
  (b) a pair of sidewalls extending, respectively, upwardly from the opposed longitudinal sides of said floor in fixed relationship with respect thereto, said side walls each extending forwardly and rearwardly of the support wheel adjacent thereto;
  (c) a first door section interposed in one of said side walls to one side of the wheel adjacent thereto for movement between open and closed positions;
  (d) a first substantially planar and rectangular roof panel hingedly secured adjacent one end thereof about an axis extending transversely between the rear end of said sidewalls for pivotal movement between a retracted position substantially parallel to and overlying said floor and an extended position forming an acute angle with respect to said floor;
  (e) a second substantially planar and rectangular roof panel hingedly secured adjacent one end thereof about an axis extending transversely between the front end of said sidewalls for pivotal movement between a retracted position substantially parallel to and overlying said first roof panel in the retracted position thereof and an extended position forming an acute angle with respect to said floor wherein the free end thereof is in abutting engagement with the free end of said first panel in the extended position thereof;
  (f) first and second substantially triangular side panels hingedly secured at one edge thereof, respectively, to each of said sidewalls for pivotal movement between a retracted position overlying and substantially parallel to said floor and an extended position wherein the edges thereof opposed to said one edge engage said roof panels when the latter are in extended engagement;
  (g) a second door section interposed in the side panel secured to said one side wall so as to assume a position coextensive with said first door section when said panel is in extended position, said second door section, when coextensive with said first door section, being movable therewith between open and closed conditions and,
  (h) counter balance means operatively associated with said roof panels to urge said panels into extended position; and wherein:
    (1) the lengths of said first and second roof panels measured, respectively, between the axes about which they are hingedly secured and the free ends thereof are substantially equal; and,
    (2) upon movement of said panels to the extended position, the free ends thereof abut along a line extending transversely of said frame and lying in a vertical plane substantially midway between said axes.

2. A trailer according to claim 1 including means interconnecting said roof panels so that movement of one of said panels between retracted and extended positions imparts corresponding movement to the other of said panels.

3. A trailer according to claim 2 wherein said means comprises a longitudinally extending track carried by one of said roof panels and a follower carried by the other of said roof panels and engaging said track.

4. A trailer according to claim 1 wherein:
  (a) the axes about which said first and second roof panels are hingedly secured are spaced inwardly of the ends of the roof panels adjacent thereto; and,
  (b) the counterbalance means comprise tension springs offset below the axes and secured between the ends of said roof panels adjacent said axes and the sidewalls.

5. A trailer according to claim 1, including:
(a) a cabinet hinged at the rearward upper edge thereof to one of said side panels about an axis parallel to the axis about which said panel is hinged to one of said sidewalls, said cabinet having a height less than the distance which said sidewall extends above said floor; and,
(b) a link hingedly secured at the opposite ends thereof, respectively, to said floor and the forward portion of said cabinet for pivotal movement about axes parallel to the axis about which said one side panel is hinged to said one sidewall, said link being positioned so as to extend parallel to said one side panel when said panel is in extended or retracted position.

6. In a trailer comprising a wheel supported frame having a draft tongue extending forwardly therefrom, an improved folding body comprising:
(a) a substantially rectangular floor received on and extending longitudinally of said frame;
(b) a first sidewall extending upwardly from one longitudinally extending side of said floor in fixed relationship thereto;
(c) a second sidewall extending upwardly from the other longitudinally extending side of said floor in fixed relationship thereto, said wall having a first door section therein hinged for pivotal opening about a vertical axis;
(d) a first fender spaced from the outside of said first wall and extending over the length thereof in fixed and parallel relationship with respect thereto;
(e) a second fender spaced from the outside of said second wall and extending over the length thereof in fixed and parallel relationship with respect thereto, said second fender having a movable section in alignment with said first door section to provide access to the outer side thereof;
(f) a first substantially rectangular roof panel extending longitudinally over said sidewalls from one end thereof, said panel having downwardly extending flanges along the longitudinal edges thereof, each of said flanges extending between one of said sidewalls and the fender spaced outside therefrom, the ends of said flanges adjacent said one end of said sidewalls being hingedly secured thereto about a transverse axis to mount said panel for pivotal movement between a retracted position substantially parallel to and overlying said floor and an extended position forming an acute angle with respect to said floor;
(g) a second substantially rectangular roof panel extending longitudinally over said sidewalls from the other end thereof, said panel having downwardly extending flanges along the longitudinal edges thereof, each of said flanges extending between one of said sidewalls and the fender spaced outside therefrom, the ends of said flanges adjacent said other end of said walls being hingedly secured thereto about a transverse axis to mount said panel for pivotal movement between a retracted position substantially parallel to and overlying said first roof panel in the retracted position and an extended position forming an acute angle with respect to said floor wherein the free end thereof is in overlapping engagement with the free end of said first panel in the extended position thereof;
(h) a first substantially triangular side panel hingedly secured at one edge thereof to said first sidewall for pivotal movement between a retracted position overlying and substantially parallel to said floor and an extended position wherein the edges thereof opposed to said one edge engage said roof panels when the latter are in extended engagement; and,
(i) a second substantially triangular side panel hingedly secured at one edge thereof to said second sidewall for pivotal movement between a retracted position overlying and substantially parallel to said floor and an extended position wherein the edges thereof opposed to said one edge engage said roof panels when the latter are in extended engagement, said second side panel having a second door section therein which assumes a position coextensive with said first door section when said panel is in extended position, said second door section when coextensive with said first door section being hinged for pivotal opening about the vertical axis about which said first door section is hinged.

7. A trailer according to claim 6 wherein said movable section is hingedly secured to said floor about an axis extending longitudinally thereof for pivotal movement between a position coextensive with said second fender and a position spaced therebelow and parallel to said floor to form a step.

8. A trailer according to claim 6, including:
(a) a cabinet hinged at the rearward upper edge thereof to the first side panel about an axis parallel to the axis about which said panel is hinged to the first sidewall, said cabinet having a height less than the distance which said first sidewall extends above said floor; and,
(b) a link hingedly secured at the opposite ends thereof, respectively, to said floor and the forward portion of said cabinet for pivotal movement about axes parallel to the axis about which said first panel is hinged to said first sidewall, said link being positioned so as to extend parallel to said first side panel when said panel is in extended or retracted position.

9. A trailer according to claim 6 including means interconnecting said roof panels so that movement of one of said panels between retracted and extended positions imparts corresponding movement to the other of said panels.

10. A trailer according to claim 9 wherein said means comprises a longitudinally extending track carried by one of said roof panels and a follower carried by the other of said roof panels and engaging said track.

11. A trailer according to claim 6 including counterbalance means operatively associated with said roof panels to urge said panels into extended position.

12. A trailer according to claim 11, wherein:
(a) the axes about which said first and second roof panels are pivotal are spaced inwardly of the ends of the roof panels adjacent thereto; and,
(b) the counterbalance means comprise tension springs offset below said axes and secured between the ends of said roof panels adjacent said axes and the sidewalls.

References Cited by the Examiner
UNITED STATES PATENTS

| 2,567,516 | 9/1951 | Jones | 296—23 |
| 2,605,494 | 8/1952 | Lyons | 20—16.0 |
| 2,837,778 | 6/1958 | Kern | 52—66 |
| 2,845,663 | 8/1958 | Harr | 296—23 X |

FOREIGN PATENTS

| 896,344 | 5/1962 | Great Britain. |

References Cited by the Applicant
UNITED STATES PATENTS

| 1,984,681 | 12/1934 | Jackson. |
| 2,561,168 | 7/1951 | Beckley. |
| 2,626,832 | 1/1953 | Guthoerl. |
| 2,686,075 | 8/1954 | Steiner. |
| 3,078,117 | 2/1963 | Martini. |
| 3,097,013 | 7/1963 | Mussler. |

BENJAMIN HERSH, *Primary Examiner.*

P. GOODMAN, *Assistant Examiner.*